United States Patent [19]
Lin

[11] Patent Number: 5,319,511
[45] Date of Patent: Jun. 7, 1994

[54] AERODYNAMIC ACTUATOR LATCH WITH MAGNETIC RETURN SPRING FOR HARD DISK DRIVE

[75] Inventor: Arthur M. Lin, Fremont, Calif.

[73] Assignee: Quantum Corporation, Milpitas, Calif.

[21] Appl. No.: 5,645

[22] Filed: Jan. 19, 1993

[51] Int. Cl.$^5$ .......................... G11B 5/54; G11B 21/22
[52] U.S. Cl. ...................................... 360/105; 360/86
[58] Field of Search ............. 360/105, 106, 86, 97.01, 360/137

[56] References Cited

U.S. PATENT DOCUMENTS

| | | | |
|---|---|---|---|
| 4,647,997 | 3/1987 | Westwood | 360/105 |
| 4,692,829 | 9/1987 | Campbell | 360/105 |
| 4,881,139 | 11/1989 | Hazebrouck | 360/105 |
| 5,034,837 | 7/1991 | Schmitz | 360/105 |
| 5,036,416 | 7/1991 | Mastache | 360/86 |
| 5,124,867 | 6/1992 | Kitahori et al. | 360/105 |

Primary Examiner—Stuart S. Levy
Assistant Examiner—Craig A. Renner
Attorney, Agent, or Firm—David B. Harrison

[57] ABSTRACT

An aerodynamic actuator latch for a disk file uses a fringe field from permanent magnets of the actuator assembly to generate a reverse bias torque, in lieu of a separate return spring. The latching mechanism includes a stop arm portion which cooperates with an actuator arm portion to ensure that the head of a disk file locked in a landing zone when the storage disk is not rotating. The reverse bias torque is preferably provided to the actuator mechanism via cooperation of a ferromagnetic slug within the stop arm portion and the fringe field of the actuator magnets.

13 Claims, 3 Drawing Sheets

AERODYNAMIC ACTUATOR LATCH WITH MAGNETIC RETURN SPRING FOR HARD DISK DRIVE

FIELD OF THE INVENTION

The present invention relates to actuator latches for latching a data transducer head and arm actuator assembly at a safe head parking region of a data storage surface in a rotating rigid disk data storage device. More particularly, the present invention relates to an integrally formed and magnetically biased, aerodynamically released actuator latch for a hard disk drive head positioner actuator structure.

BACKGROUND OF THE INVENTION

The assignee of the present invention has pioneered the concept of an aerodynamically released actuator latch for hard disk drives. By way of examples, the reader's attention is directed to commonly assigned U.S. Pat. No. 4,538,193 for "Aerodynamically Released Safety Latch for Data Transducer Assembly in Rotating Rigid Disk Data Storage Device". The disclosure of the referenced patent is incorporated herein by this reference. The reader's attention is further directed to commonly assigned U.S. Pat. No. 4,647,997 for "Aerodynamic Latch for Disk File Actuator"; U.S. Pat. No. 4,692,829 for "Magnetically Biased Aerodynamically Released Integral Safety Latch for Rigid Disk Drive"; and, U.S. patent application Ser. No. 07/839,870 for "Airflow Generator Spindle Hub for Aerodynamically Released Disk Drive Actuator Latch", now abandoned; the disclosures of which are also incorporated herein by reference.

Aerodynamically released shipping latches of the type described in the reference patents have proven very successful in operation. The distinct advantage of an aerodynamically released shipping latch and its manner of operation are explained in these prior patents. Several drawbacks of aerodynamically released shipping latches in accordance with the inventions described in the cited patents have remained unsolved until the present invention. One drawback has been associated with the use of mechanical hair springs which are required in order to provide a sufficient reverse bias force to the latch in order to cause it to engage the rotary data transducer assembly in order to lock the transducer at inner landing zone regions of the data surfaces of the storage disks. Installation of the delicate hair springs during drive assembly has proven to require a difficult manual procedure which has not been well suited to automatic or robotic assembly procedures for high volume production. Also, the reverse bias force applied by mechanical hair springs has tended to be substantially constant, irrespective of the degree of angular deflection caused by air flow from the rotating disks, which has required that the bias force be sufficiently high to overcome any static friction associated with the moving aerodynamic latch member and the base or frame of the device to which such moving member is journalled.

Another drawback of the prior aerodynamic latches has been associated with use over a substantial range of angular displacement. It was heretofore believed that the shipping latch should rotate over a fairly substantial angle in response to air flow in order to be assured that the air flow generated by disk rotation was sufficient to sustain the data transducers in "flying" formation closely above the data surfaces of the disks before they were permitted to depart from their respective landing-/parking zones. Also, a substantial degree of rotation of the latch was required in order to permit the latch to be installed after the disk stack has been mounted to the drive spindle during disk drive assembly.

One more drawback has been associated with the use of a separate counterweight which has required additional parts and steps in the latch/drive manufacturing process. Commonly assigned U.S. Pat. No. 4,692,829 describes a safety latch for a storage device, for locking the transducer carriage to restrain the data transducer to a predetermined latching zone during non-rotation of data storage disks and for releasing the carriage in response to airflow generated by disk rotation. The latch mechanism includes a moveable airvane disposed between two disks for being deflected by airflow generated by rotations of the disks and latching member responsive to the deflection of the airvanes to release the carriage. In this patent, the latch includes a magnetic spring comprising two outboard magnets for providing a magnetic bias spring for providing a predetermined bias by magnetic field deflection to the latch in order to urge the latch into engagement with the carriage in the absence of airflow sufficient to deflect the airvane to overcome the bias and thereby release the latch. The magnetic spring in this patent included two small plastic magnets 62 and 64 to have north poles on major surfaces facing each other, as shown in FIGS. 1 and 3. The magnet 62 is seated in a shallow recess 66 formed in the latching portion 50 of the member 32, and the magnet 64 is seated in a similar recess 68 formed in the inside of the sidewall 12 of the frame. The magnets 62 and 64 are flat and shallow, and present their oppositely facing, like pole faces in a manner which generates maximum repulsion when the member 32 is maximally deflected due to air flow. The two forces create a state of equilibrium, and in operation, the two magnets 62, 64 do not actually contact each other. The sizes, locations and magnetic field strength characteristics of the magnets 62 and 64 are selected to provide suitable reverse bias force to the member so that it will be positively and reliably urged to engage the notch 54 when airflow from disk rotation diminishes to a point that the reverse bias from the magnets 62, 64 exceeds the airflow force. The above described magnetic bias spring arrangement, although effective in operation, has not proven to be cost effective and has seen diminished practical utility as hard disk drives become smaller. For example, in a 3½" form factor hard disk drive, this type of magnetic bias spring requires special attention to mounting arrangements and methods for installing the opposed-field permanent magnets, and has obviously required additional components and expenses associated therewith.

A torsion spring has also been utilized on a molded plastic air lock barrel as a bias against the deflection of the latch assembly, see e.g. FIG. 2 of referenced U.S. Pat. No. 4,647,997. These springs can be relatively costly compared to the overall cost of the disk drive. In addition, the torsion spring tends to wander up the airlock barrel and fall off. In this type of arrangement, assembly of the spring, which comprised wrapping the spring around the barrel, was difficult. Finally, vendors are unable to consistently produce torsion springs with the required angular tolerances.

A need has risen for an aerodynamically released shipping latch that does not require the additional bias magnetic spring, mechanical hair spring or torsion spring associated with prior art. The present invention addresses such a need.

SUMMARY OF THE INVENTION WITH OBJECTS

A general object of the present invention is to provide an improved aerodynamically released shipping latch for a rotating rigid disk data storage device which overcomes limitations and drawbacks of the prior art.

A more specific object of the present invention is to provide a aerodynamic latch which utilizes stray magnetic field force supplied by existing actuator magnets for applying a bias force to the actuator assembly to urge it toward, and maintain it at, the latched position.

Another specific object of the present invention is to provide an aerodynamic latch with a non-linear return spring so that the latch will remain securely in the latched position when the disks are not spinning, yet will release readily from the latched state when the disks are spinning and generating airflow.

Yet another specific object of the present invention is to provide an aerodynamic latch with a minimum number of parts, so as to be realized at very low additional cost.

A further object of the present invention is to provide for a cost-reduced aerodynamically biased shipping latch mechanism which is considerably simplified over prior approaches, and which operates reliably over the entire useful life of the disk drive.

Yet another object of the present invention is to provide a simplified shipping latch mechanism which may be installed with automatic fabrication equipment and which further aids and facilitates robotic assembly of the disk drive.

In one aspect the present invention relates to a safety latch for locking a rotary actuator assembly of a disk drive to restrain a data transducer at the landing zone during the non-rotation of the disks and for releasing the latch in response to airflow generated by disk rotation. The latch comprises a moveable airvane disposed adjacent to rotating surfaces of the disks for being deflected by airflow incident to disk rotation, and a stop arm portion coupled to the airvane means for engaging the actuator assembly responsive to non-rotation of the disks and disengaging from the actuator assembly when the moveable airvane is deflected by airflow. The stop arm portion includes a ferromagnetic material therewithin which is attracted to a stray magnetic field provided by a permanent magnet structure of the actuator, the attraction providing a bias force to the latch in a sense counter to the airflow-providing force.

In a related aspect of the present invention, the ferromagnetic material within the stop arm portion is of low carbon steel and the latch is rotatable about an axis of rotation, wherein the airvane structure of the latch is disposed on one side of the axis of rotation and the stop arm portion of the latch is disposed on the other side of the axis of rotation.

In another aspect of the present invention, the latch is one integral structure and further comprises integrally formed therewith a counterweight to eliminate any gravitational force effect upon the latch, the counterweight being mechanically coupled between the airvane and the stop arm portion.

In still one more aspect of the present invention, the latch is formed as a molding of plastic material and the ferromagnetic material is embedded in the plastic material at an outer end of the stop arm portion.

The foregoing and other objects, advantages and other features of the present invention will be further appreciated and better understood by considering the following detailed description of a preferred embodiment, presented in conjunction with the accompanying drawings.

DETAILED DESCRIPTION OF A PREFERRED EMBODIMENT

Figure 1:
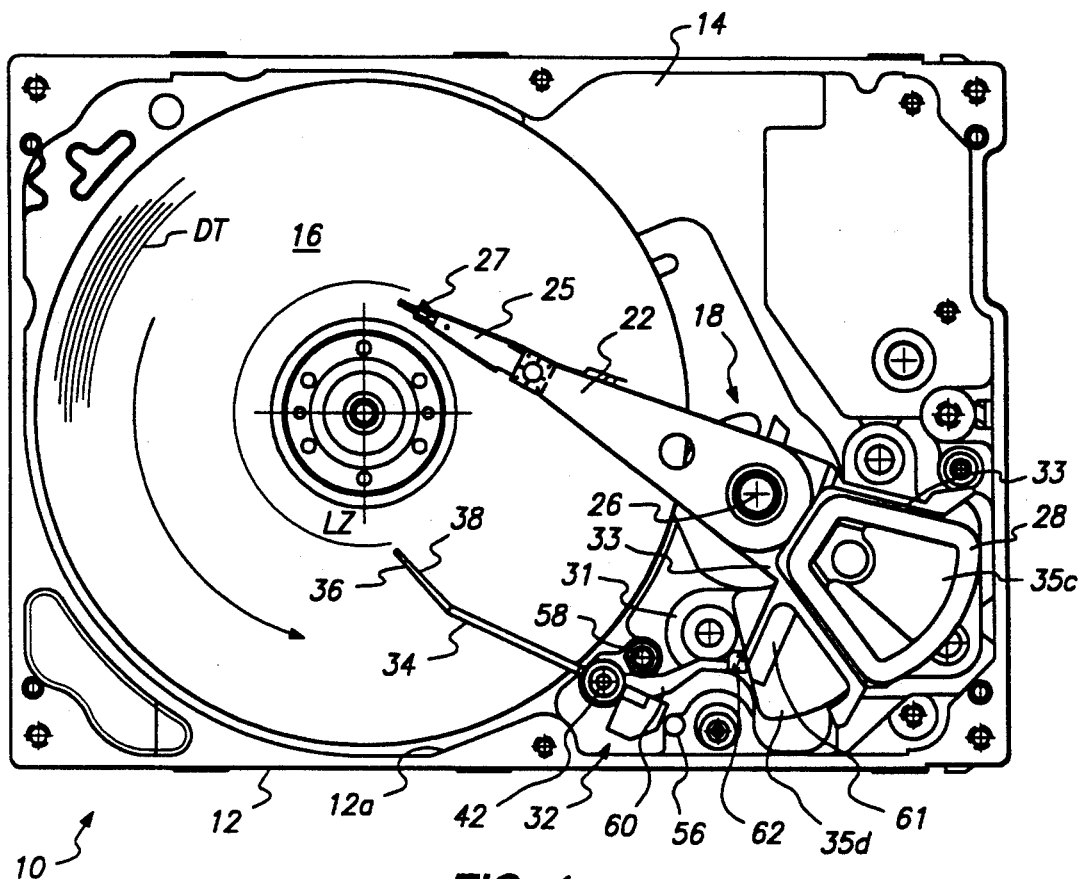
FIG. 1 is an enlarged plan view of a head and disk assembly for a Winchester fixed drive, including the aerodynamic latch member in accordance with the principles of the present invention.

A head and disk assembly (HDA) 10 of a rigid rotating disk drive data storage device is depicted in FIG. 1. Therein, the assembly 10 is shown to include a sidewall portion 12 of a base casting or frame 14, two data storage disks 16, 17 which are commonly journalled to the frame 14 via a direct drive spindle motor (not shown). One of the disks 16 and one head arm 22 are shown together in the FIG. 1 plan view. The head arm 22 secures one end of, and positions, a load beam 25 to which a data read/write transducer head slider 27 is attached at the outer end. The slider 27 includes a data transducer head, most preferably formed as a thin film head, for example. The load beam 25 is designed to act as a spring as well as a support, and it applies a predetermined loading force on the head slider 27 to urge it toward the storage surface of the disk 16. This force is overcome by an air bearing generated by the rotation of the disks 16 and 17 during operations of the data storage subsystem of which the HDA 10 is an integral part. There are other head arms 22 and load beams in vertical alignment which form a "head stack". The head stack is commonly mounted to a rotary voice coil actuator assembly 18. The assembly 18 is journalled for rotation about an axis of rotation noted by a reference numeral 26. The actuator assembly 18 is moveable through a range of limited angular displacement after an actuator lock incorporating principles of the present invention has disengaged therefrom.

The rotary actuator assembly 18 is mounted to a shaft fixed to the frame 14 at the axis 26 by suitable bearings (not shown) so that the actuator assembly 18 is generally free to rotate along a locus of limited rotational displacement, thereby moving the head 27 from an outer region of the disk 16 to an inner region thereof, including a radially inwardmost landing zone LZ. Electronics circuitry, such as a read preamplifier/write driver and switch circuit, and other related circuit elements including electrical connections extending to the data transducer head 27 are mounted to e.g. a flexible plastic film circuit substrate. An extension of substrate 10 exits the interior space of the HDA 10 between an upper lip of the base sidewall and a gasket sealing a cover (not shown) to the upper peripheral lip of the continuous sidewall 12. The cover encloses and seals the interior space defined by the base 14 and sidewall 12 in order to keep the space free of contaminants otherwise interfering with flying operations of the slider 27 as is conventional in Winchester hard disk technology.

The actuator assembly 18 includes an actuator arm portion 61 which extends outwardly to face an outward end face of a stop arm portion 60 of an aerodynamically released actuator latch mechanism 32. The interaction of the latch stop arm portion 60 with the actuator arm portion 61 will be discussed in detail later in this specification. Also included within the rotary actuator assembly 18 is a flat, generally wedge shaped actuator voice coil 28 (shown in outline form in FIG. 1). The actuator voice coil 28, comprising a coil of insulated small gauge copper wire, is preferably formed into an integral coil structure by conventional plastic encapsulation/molding techniques. The coil structure body 28 is then attached to a somewhat Vee-shaped carrier structure 33 of the actuator structure by conventional bonding techniques. The flat voice coil 28 is positioned within a magnetic gap having intense magnetic fields. The fields are established by e.g. plural high flux intensity permanent magnets 35a and 35b shown in outline in FIG. 4a and secured to an upper flux return plate 30 of high magnetic permeability such as steel and two similar magnets 35c and 35d secured to a lower flux return plate 31 formed of the same material (see FIGS. 4B and 5B).

The two magnets 35a and 35b have pole faces of opposite polarity directly facing opposite legs of the coil 28. Similarly, the two magnets 35c and 35d have pole faces of polarity complementary with the oppositely facing pole faces of the magnets 35a and 35b. The magnets 35 and resultant intense magnetic fields are such that current passing through the coil 28 in one direction causes rotation of the actuator assembly 18 in one radial direction relative to the disks 16 and 17 such as the radially outward "unlatch" direction, while reverse current causes reverse direction movement such as the radially inward "latch" direction. The high flux intensity magnets 35 may comprise ceramics of a magnetized rare earth element such as neodymium, for example.

The load beam 25 and its associated transducer head slider 27 are moveable between the radially innermost landing zone LZ and a multiplicity of concentric tracks DT defined on the storage surface of the disks 16 and 17. To prevent damage to the data tracks when the transducers are not flying on an air bearing generated by the rotation of the disks 16,17 it is established practice to restrain the transducers 27 at the landing zone LZ. The commonly assigned patents referred to above are directed specifically to this task of restraining the carriage to hold the transducers to the landing zone in the absence of airflow from the disks 16 and 17.

Figure 2:
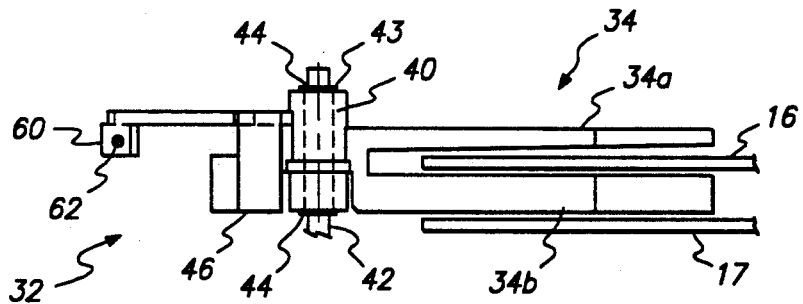
FIG. 2 is a side view of an improved aerodynamic latching mechanism for a disk drive incorporating the principles of the present invention.
Figure 3:
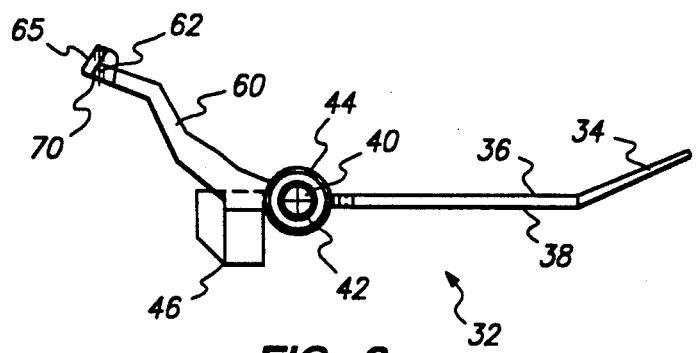
FIG. 3 is a top view of the latching mechanism of FIG. 1 in accordance with the present invention.

In accordance with principles of the present invention a fringe magnetic field 63 provided by the existing magnets 35 is used to induce and apply a reverse bias force to assist in operating the aerodynamically released latching mechanism 32. As is seen in the FIGS. 1 and 4A, the latch mechanism 32 restrains the actuator 18 in order to park the sliders 27 at the landing zone when the disks 16 and 17 are not rotating at their nominal spindle speed, e.g. 5400 RPM. Referring now to FIGS. 2 and 3, an integrally molded aerodynamic latch body 32 is preferably formed of suitable injection molded plastic material. The body 32 includes a forked integral airvane portion 34 having a tine 34a which is disposed above the disk 16 and a tine 34b which is vertically aligned with the tine 34a and located between the two disks 16, 17.

The airvane portion 34 extends almost to the inner hub region of the disk spindle so as to present a substantial vane surface to airflow generated by the disks 16, 17. The airvane portion 34 includes flat front and back surfaces 36 and 38. A central journal region 40 of the body 32 defines a vertical axial opening enabling the body 32 to be rotatably mounted to the frame 14 via a pin 42. The pin 42 is press-fit into a well formed to receive the pin. The body 32 is retained in place on the pin 42 by a suitable fastener such as a slightly undersized washer 43 which is press-fit over the pin 42 and seated in an annular groove formed just below the top of the pin 42.

Annular chamfers 44 are provided at the upper and lower ends of the central region 40 in order to minimize the surface contact between the moving member 32 and the stationary frame 14, thereby reducing static friction loading as the body 32 rotates about the pin 42.

A generally box-shaped counterweight 46 is formed integrally with the body 32. The counterweight 46 is sized and disposed to counterbalance the member 32 relative to gravitational forces, so that the body 32 is mass-balanced about the pin 42. The latch stop arm portion 60 also cooperates with two fixed location pins 56 and 58 to effectively limit the range of pivotal displacement of the latch member 32. The pin 56 comprises a vertical extension of the base 14, while the pin 58 is threaded into a threaded opening of the base 14 after the body 32 has been installed. (In this regard, the airvane portion 34 includes a contour which is made to be substantially congruent with an adjacent sidewall segment 12a of the HDA 10 extending adjacently away from the pin 42 on the opposite side of the actuator 18. This contour facilitates automatic robotic installation of the body 32 and subsequent rotation to the latched position shown in FIGS. 1 and 4A.) After the latch body 32 is in place, the pin 58 is installed. Thus, the pin 58 limits latch member 32 displacement at the fully latched position reached in the absence of airflow, and the pin 56 limits latch member 32 displacement at fully unlatched position reached via response of the body 32 to airflow displacement forces.

Extending from the counterweight portion opposite the airvane portion is the stop arm portion 60. Embedded within the stop arm portion 60 is a ferromagnetic slug 62 which is preferably cylindrical in shape. Typically, the slug 62 is composed of a low carbon steel and is attracted by the stray flux of the two magnets 35b and 35d within the actuator assembly 18.

Figure 4B:
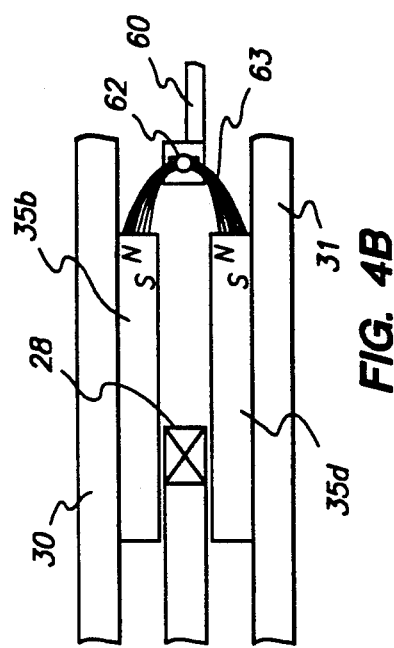
FIG. 4B is a cross-sectional view in elevation through the stop arm end of the latch mechanism when in the FIG. 4A position, and adjacent rotary actuator structure, in which view flux lines are shown to illustrate the stray magnetic field for creating the bias force.
Figure 4A:
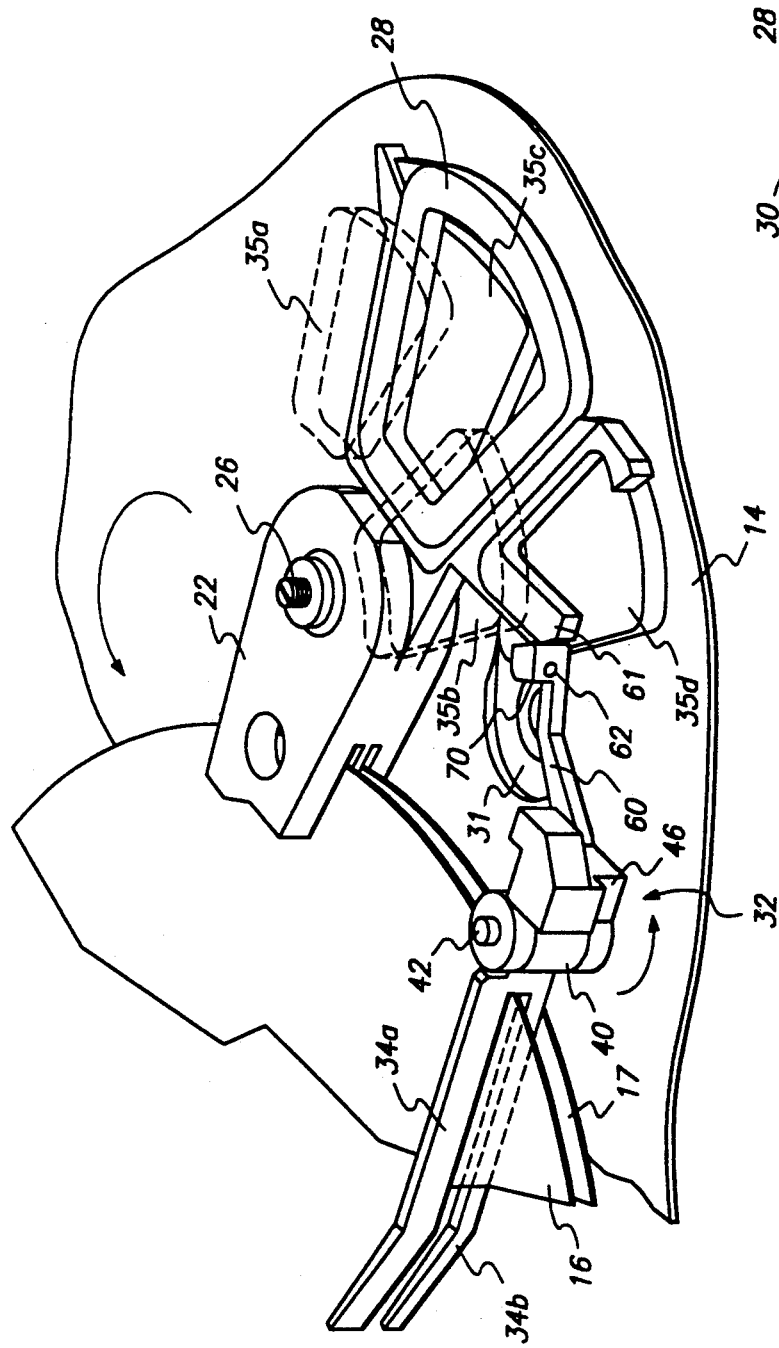
FIG. 4A is a highly diagrammatic view in perspective of a relevant portion of the FIG. 1 view, showing the latching mechanism in the latched position with the upper flux plate and magnet assembly removed.

Referring now to FIG. 4A, the actuator 18 is at the latched position with the head slider 27 parked at the landing zone LZ. The disks 16 and 17 are not rotating, and the latch body 32 is in the latched position. The ferromagnetic slug 62 is in close proximity to the fringe field 63 of the upper and lower magnets 35b, 35d. A face 65 of the stop arm portion 60 is substantially perpendicular to a radial line extending from the latch body pin 42 and faces a similarly facing end surface 67 of the actuator arm portion 61, thereby preventing the actuator assembly 18 to rotate in a radially outward direction relative to the disks 16, 17. In this position, a considerable bias force is exerted upon the ferromagnetic slug 62 of the stop arm portion 60 by virtue of the stray magnetic field provided by the upper and lower magnets 35b and 35d, as shown in FIG. 4B.

Figures 5A, 5B:
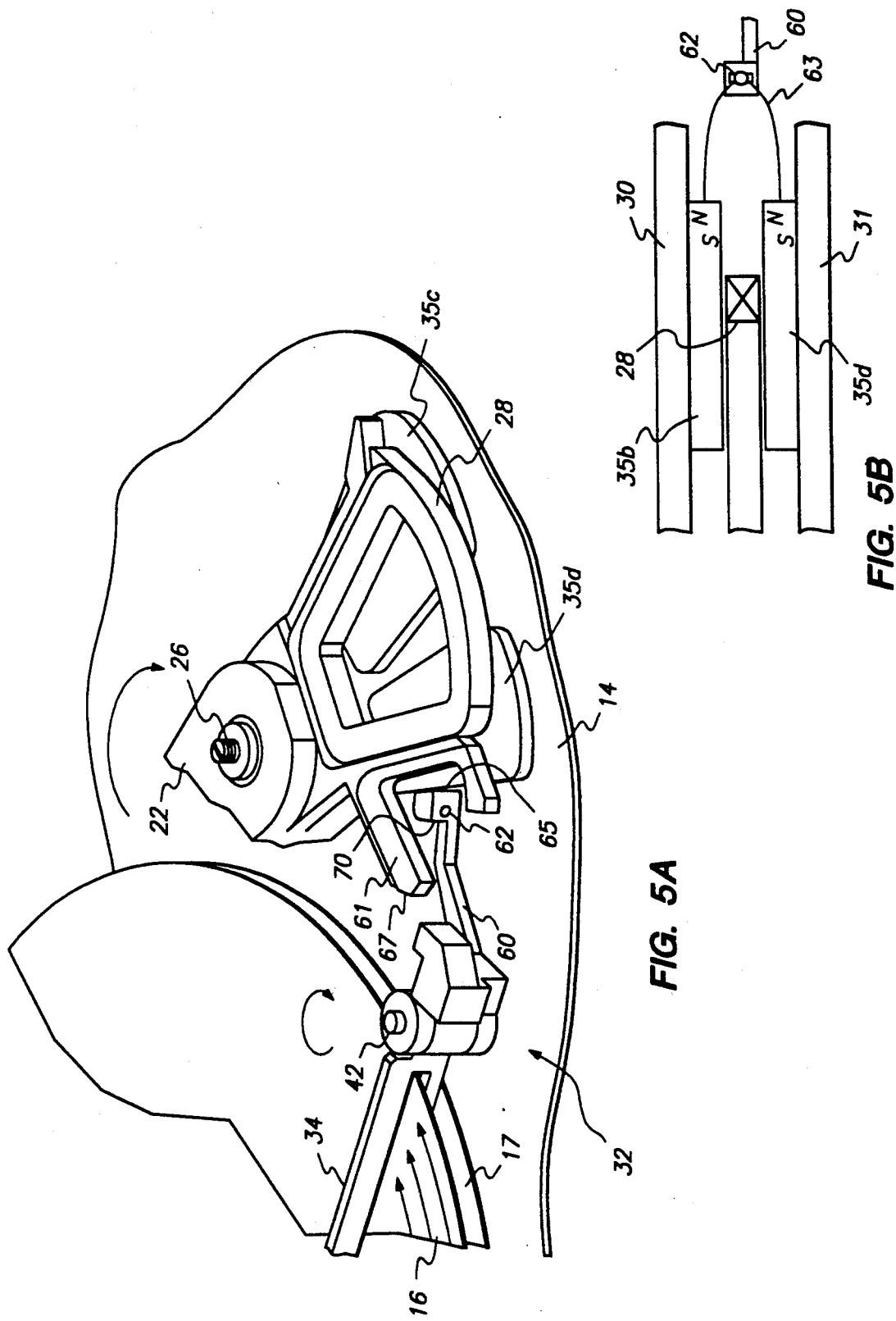
FIG. 5A is a highly diagrammatic view in perspective, similar to the FIG. 4A view, showing the latching mechanism in the released position.
FIG. 5B is a cross-sectional view, similar to the FIG. 4B view, showing the stop arm end and adjacent rotary actuator structure in the FIG. 5A position.

When the disks 16 and 17 are brought to their nominal operational rotation, e.g. 5400 RPM or faster, in a counterclockwise direction as viewed in FIGS. 1 and 5A, the resultant airflow generated by disk rotation impinges upon the airvane portion 34 with sufficient force to cause the attraction force of the ferromagnetic slug 62 to the stray magnetic field adjacent the actuator magnets 35 to be overcome; and, the actuator body 32 thereupon rotates to the release position, shown in FIG. 5A. This radial displacement of the actuator latch body 32 to the release position has the effect of moving the stop arm portion out of the way of the actuator arm portion 61, thereby releasing the actuator 18 for movements along its locus of limited rotational displacement. At the same time, the rotational movement of the body 32 causes the stop arm portion to be displaced slightly away from the magnets 35 and results in a reduced magnetically induced bias force, as shown in FIG. 5B.

After power to the spindle motor is removed and the disks 16 and 17 are spinning down, the energy stored in the rotating disks is automatically supplied to the actuator coil 28 in a flow direction appropriate to cause the actuator to move quickly toward the landing zone LZ. After this movement has occurred, airflow bias force drops as the disks spin down. When magnetic bias force equals and then exceeds airflow force, the ferromagnetic body 62 is caused to move to the latched position wherein the face 65 directly abuts the facing end surface 67 of the actuator arm portion 61. During pivoting of the body 32 to the latched position, the stop arm portion 60 passes by and clears a side surface 70 of the end of the stop arm portion 60.

By virtue of the present invention it will be appreciated that when the disks 16 and 17 are rotating in the counter-clockwise direction, the latch member 32 is pivoted such that it is opened or unlatched thereby allowing the actuator assembly 18 to move due to the aerodynamic force created by the spinning disks 16 and 17. However when the disks 16 and 17 are not spinning, the latch member 32 positively locks the actuator assembly 18 due to the magnetic attraction of the slug 62 to the fringe magnetic field 63 of the magnets 35b and 35d (as shown in FIGS. 4B and 5B).

Accordingly, the present invention enables the transducer heads 27 of an actuator assembly 1, to be positively latched during takeoff, landing and non-operation of the hard disk drive assembly at a predetermined radially innermost landing position LZ. In addition, the present invention overcomes the problems associated with prior art latching mechanisms such as a torsion spring or a separate magnetic bias spring. An improved aerodynamic shipping latch is provided through the cooperation of the stop arm portion 60 and its associated ferromagnetic slug 62 with the actuator arm 61 and the fringe magnetic flux 63 created by the preexisting actuator magnets 35b and 35d.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosures and the description herein are purely illustrative and are not intended to be in any sense limiting.

What is claimed is:

1. In a data storage device including a base and at least one rigid rotatable data storage disk providing at least one data storage surface for storage and retrieval of useful data, at least one moveable data transducer for reading and writing data from and to the data storage surface, the transducer being mounted on a voice coil actuator assembly moveably mounted to the base, the voice coil actuator assembly including an actuator voice coil, permanent magnet means fixed to the base for creating a magnetic field in close proximity to the voice coil to induce rotational force in the actuator assembly in response to current flow through the actuator voice coil, the transducer flying in close non-contacting proximity to the data storage surface upon an air cushion provided during disk rotation, a landing zone being defined upon the storage surface for the transducer during non-rotation of the disk, the voice coil actuator assembly for moving the transducer from the landing zone to any selectable track during operation of the device, an actuator latch mechanism for locking the voice coil actuator assembly to restrain the transducer to the landing zone during disk non-rotation and for releasing the voice coil actuator assembly in response to airflow generated by disk rotation, the latch mechanism comprising:

moveable airvane means adjacent to the rotating data storage surface for being deflected by an airflow force generated by disk rotation; and a stop arm means coupled to the airvane means for engaging the actuator assembly during non-rotation of the disk when the transducer is at the landing zone, and for disengaging from the actuator assembly when the moveable airvane means is deflected, the stop arm means including a ferromagnetic body therewith which is attracted to a fringe magnetic field provided by the permanent magnet means thereby providing a bias force to the latch mechanism in an opposite direction relative to the airflow force.

2. The latch mechanism set forth in claim 1 in which the voice coil actuator assembly comprises a rotary voice coil actuator which is journalled to the base for rotation over a limited range of rotational displacement.

3. The latch mechanism set forth in claim 2 in which the magnet means comprises first and second flux return members, the flux return members being spaced apart by the voice coil and being opposite each other, at least one of the members having at least one permanent magnet mounted thereon, the magnet defining magnetic poles such that the current through the voice coil in one direction causes the actuator to rotate in one direction and current through the voice coil in the opposite direction causes the actuator assembly to rotate in the opposite direction.

4. The latch mechanism set forth in claim 1 in which the ferromagnetic body is comprised of low carbon steel.

5. The latch mechanism set forth in claim 1 in which the latch mechanism is rotatable about an axis of rotation substantially parallel to an axis of rotation of the disk, wherein the moveable airvane means is disposed generally on one side of the axis of rotation of the latch mechanism and wherein the stop arm means is disposed generally on the other side of the axis of rotation of the latch mechanism.

6. The latch mechanism set forth in claim 1 comprising an integrally formed structure molded of a suitable plastic material.

7. The latch mechanism set forth in claim 5 further comprising a counterweight means for eliminating any gravitational force effect upon the latch mechanism, the counterweight means being coupled between the airvane means and the stop arm means.

8. The latch mechanism set forth in claim 1 in which the voice coil actuator assembly comprises a rotary voice coil actuator which is journalled to the base for rotation over a limited range of rotational displacement, the latch mechanism comprises an integrally formed structure molded of suitable plastic material and includes a counterweight portion for eliminating any gravitational force effect, and wherein the ferromagnetic body is embedded in a radially outermost portion of the stop arm means.

9. The latch mechanism set forth in claim 1 further comprising a plurality of rigid rotatable disks and wherein the moveable airvane means defines a plurality of tines, at least one tine disposed between two adjacent ones of the rotatable disks.

10. The latch mechanism set forth in claim 1 wherein the moveable airvane means is contoured to be substantially congruent to a region of a sidewall of the device adjacent to the disk and also adjacent to a mounting means for mounting the latch mechanism.

11. In a data storage device including a base and at least one rigid rotatable data storage disk providing at least one data storage surface for storage and retrieval of useful data, at least one moveable data transducer for reading and writing data from and to the data storage surface, the transducer being mounted on and positioned by a rotary voice coil actuator assembly journalled to the base, the voice coil actuator assembly including a flat actuator voice coil, a permanent magnet structure fixed to the base and defining a magnetic gap through which the actuator voice coil is moved in response to rotational force in the actuator assembly in response to current flow through the actuator voice coil, the transducer flying in close non-contacting proximity to the data storage surface upon an air cushion provided during disk rotation, a landing zone being defined upon the storage surface for the transducer during non-rotation of the disk, the voice coil actuator assembly for moving the transducer from the landing zone to any selectable track during operation of the device, a unitary actuator rotary latch mechanism formed of molded plastic material and journalled to the base at a latch pin for locking the rotary actuator assembly in a latched position to restrain the transducer to the landing zone during disk non-rotation and for moving to a release position for releasing the rotary actuator assembly in response to airflow generated by disk rotation, the latch mechanism comprising:

a central body portion defining a transverse opening for engaging the latch pin, a moveable airvane portion extending from the central body portion and extending outwardly to be adjacent to the rotating data storage surface for deflection by an airflow torque generated by disk rotation;

a counterweight portion extending from the central body portion on an opposite side of the moveable airvane portion, for eliminating any gravitational force effect upon the latch mechanism; and, a stop arm portion extending from the central body portion generally oppositely from the airvane portion, and including an outer stop face for engaging the actuator assembly and thereby stopping rotation thereof during non-rotation of the disk when the transducer is at the landing zone, and for disengaging from the actuator assembly when the moveable airvane means is deflected, the stop arm portion including imbedded therewithin a ferromagnetic body which is attracted to a fringe magnetic field provided by the permanent magnet structure, thereby providing a bias torque to the latch mechanism counter-rotational to the airflow torque.

12. The latch mechanism set forth in claim 11 wherein the outer stop face of the stop arm portion is substantially perpendicular to a radius locus extending therefrom to the latch pin, and wherein the actuator assembly includes an actuator arm portion having an other end substantially congruent with the outer stop face.

13. The latch mechanism set forth in claim 12 wherein a locus of rotation of the outer end of the actuator arm portion is substantially aligned with the radius locus of the latch mechanism when in the latched position.

* * * * *